United States Patent
Guo

(10) Patent No.: US 9,323,364 B2
(45) Date of Patent: Apr. 26, 2016

(54) INTERACTIVE METHOD, APPARATUS AND SYSTEM

(71) Applicants: Beijing Lenovo Software Ltd, Beijing (CN); Lenovo (Beijing) Co., Ltd., Beijing (CN)

(72) Inventor: Cheng Guo, Beijing (CN)

(73) Assignees: Beijing Lenovo Software Ltd, Beijing (CN); Lenovo (Beijing) Co., Ltd., Beijing (CN)

( * ) Notice: Subject to any disclaimer, the term of this patent is extended or adjusted under 35 U.S.C. 154(b) by 36 days.

(21) Appl. No.: 13/795,974

(22) Filed: Mar. 12, 2013

(65) Prior Publication Data

US 2013/0241856 A1    Sep. 19, 2013

(30) Foreign Application Priority Data

Mar. 19, 2012  (CN) .......................... 2012 1 0073275

(51) Int. Cl.
| | | |
|---|---|---|
| *G06F 3/041* | (2006.01) | |
| *G06F 3/0488* | (2013.01) | |
| *G06F 3/039* | (2013.01) | |

(52) U.S. Cl.
CPC ............... *G06F 3/041* (2013.01); *G06F 3/039* (2013.01); *G06F 3/0416* (2013.01); *G06F 3/0488* (2013.01)

(58) Field of Classification Search
CPC ....... G06F 3/041; G06F 3/039; G06F 3/0416; G06F 3/0488
USPC .................................. 345/173–174; 463/1–47
See application file for complete search history.

(56) References Cited

U.S. PATENT DOCUMENTS

| | | |
|---|---|---|
| 8,086,332 B2 | 12/2011 | Dorogusker et al. |
| 2007/0201705 A1 | 8/2007 | Dorogusker et al. |

(Continued)

FOREIGN PATENT DOCUMENTS

| | | |
|---|---|---|
| CN | 101504582 A | 8/2009 |
| CN | 102186135 A | 9/2011 |
| CN | 202159302 U | 3/2012 |

OTHER PUBLICATIONS

Mattel (Youtube video "Hand-on With Mattel's Apptivity toys and games", dated Feb. 14, 2012, URL: https://www.youtube.com/watch?v=ggebxZXGoBo).*

First Chinese Office Action regarding Application No. 201210073275.9, dated Feb. 26, 2014. Translation provided by Espace.

(Continued)

*Primary Examiner* — Ilana Spar
*Assistant Examiner* — Charles Zheng
(74) *Attorney, Agent, or Firm* — Harness, Dickey & Pierce, P.L.C.

(57) ABSTRACT

Interactive method, apparatus and system are provided, which relate to communication field, achieve interaction between an electronic apparatus and an accessory, and improve user experience. The interactive method is applied to an electronic apparatus and an accessory independent of the electronic apparatus, including: obtaining a first display state of the display device, wherein the first display state is a display state in a case that the electronic apparatus operates independently; obtaining position information of the accessory, wherein the position information is information indicating the position of the accessory on the display device; obtaining attribute information of the accessory, wherein the attribute information is used to change the display state of the display device; generating a state changing instruction according to the position information and the attribute information; and switching the first display state of the display device to a second display state according to the state changing instruction.

10 Claims, 3 Drawing Sheets

(56) References Cited

U.S. PATENT DOCUMENTS

2008/0106517 A1 5/2008 Kerr et al.
2011/0227871 A1* 9/2011 Cannon .................. 345/174

OTHER PUBLICATIONS

Second Chinese Office Action regarding Application No. 201210073275.9, dated Jul. 24, 2014. Translation provided by Espace.

* cited by examiner

INTERACTIVE METHOD, APPARATUS AND SYSTEM

CROSS-REFERENCE TO RELATED APPLICATIONS

The present application claims the priority of Chinese Patent Application No. 201210073275.9, titled "INTERACTIVE METHOD, APPARATUS AND SYSTEM", and filed with the Chinese State Intellectual Property Office on Mar. 19, 2012, the entire disclosure of which is incorporated herein by reference.

FIELD OF THE INVENTION

The invention relates to communication field and in particular to an interactive method, apparatus and system.

BACKGROUND OF THE INVENTION

With the development of digital technology, digital apparatuses can be used in a wider range, and software systems cooperating with the digital apparatuses become more diverse. However, for currently-used demonstration or simulation systems of the digital apparatuses, the whole process is implemented by merely a computer and related software, without connection with external physical objects. For example, when demonstration is given to a user by utilizing multimedia software in the computer, all processes are completed in virtual environment of software, without interaction with physical objects. In this way, the user can only receive information passively, and cannot interact with and control the computer according to user's requirement; in this passive demonstration mode, the demonstration can only be performed according to programs designed by the software systems in advance, and the demonstration effect is not ideal.

SUMMARY OF THE INVENTION

According to embodiments of the invention, interactive method, apparatus and system for computer desktops and accessories are provided, in which interaction between the electronic apparatus and the accessory is achieved and user experience is improved by obtaining position information of the accessory and changing the displayed image according to the position information of the accessory.

In order to achieve the above object, according to embodiments of the invention, following technical solutions are adopted.

According to the invention, an interactive method is provided, which is applied to an electronic apparatus and an accessory independent of the electronic apparatus, where the electronic apparatus includes a display device, the method includes:

obtaining a first display state of the display device, where the first display state is a display state in a case that the electronic apparatus operates independently;

obtaining position information of the accessory, where the position information is information indicating the position of the accessory on the display device;

obtaining attribute information of the accessory, where the attribute information is used to change display state of the display device;

generating a state changing instruction according to the position information and the attribute information; and switching the first display state of the display device to a second display state according to the state changing instruction, where the second display state is a display state in a case that the electronic apparatus and the accessory operate interactively, and the first display state is different from the second display state.

According to the invention, an electronic apparatus is further provided, which includes a display device, and the electronic apparatus further includes:

a first obtaining module, configured to obtain a first display state of the display device, where the first display state is a display state in a case that the electronic apparatus operates independently;

a second obtaining module, configured to obtain position information of the accessory, where the position information is information indicating the position of the accessory on the display device; and obtain attribute information of the accessory, where the attribute information is used to change display state of the display device;

a processing module, configured to generate a state changing instruction according to the position information and the attribute information; and a response module, configured to switch the first display state of the display device to a second display state according to the state changing instruction, where the second display state is a display state in a case that the electronic apparatus and the accessory operate interactively, and the first display state is different from the second display state.

According to the invention, an interactive system is further provided, which includes a display device, an electronic apparatus and an accessory, where the display device is configured to display an image;

the electronic apparatus is configured to obtain position information and attribute information of the accessory, generate a state changing instruction according to the position information and the attribute information of the accessory, and switch a first display state of the display device to a second display state according to the state changing instruction; and the accessory is placed on the display device and is configured to transmit the position information and the attribute information of the accessory to the electronic apparatus.

In the interactive method, apparatus and system according to the embodiments of the invention, by dynamically changing the position of the accessory placed on the display device, the electronic apparatus obtains the position information and the attribute information of the accessory placed on the display device, generates the state changing instruction, and changes the display state of the display device according to the state changing instruction, thus the interaction between the accessory and the electronic apparatus is achieved, the dynamic interaction between the user and the electronic apparatus is further achieved, and the user experience is improved.

BRIEF DESCRIPTION OF THE DRAWINGS

In order to illustrate technical solutions of the embodiments of the invention or the prior art more clearly, drawings to be used in descriptions of the embodiments or the prior art are introduced briefly hereinafter. Obviously, the drawings described below are only some embodiments of the invention, and those skilled in the art can obtain other drawings from these drawings without any creative work.

DETAILED DESCRIPTION OF THE INVENTION

Technical solutions of the embodiments of the invention will be described clearly and completely below in conjunction with the drawings of the embodiments of the invention. Obviously, the embodiments described are only some but not all of embodiments of the invention. All other embodiments obtained by those skilled in the art from the embodiments of the invention without any creative work fall within the protection scope of the invention.

First Embodiment

Figure 1:
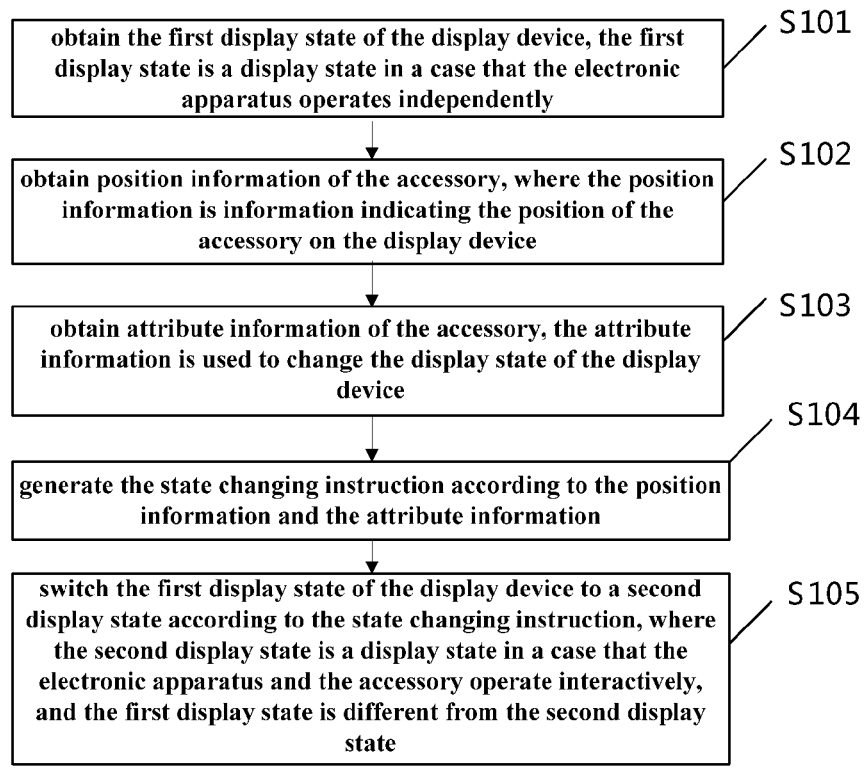
FIG. 1 is a flowchart of a method according to the invention.

According to an embodiment of the invention, it is provided an interactive method which is applied to an electronic apparatus and an accessory independent of the electronic apparatus, where the electronic apparatus includes a display device. As shown in FIG. 1, the method includes:

S101, obtaining a first display state of the display device, where the first display state is a display state in a case that the electronic apparatus operates independently.

In the embodiment of the invention, the display device refers to a display with an image displaying function, such as a Liquid Crystal Display, an electronic display screen, a capacitive/resistive touch-screen display. The display device is connected with the electronic apparatus and is configured to display according to display state of operation state of the electronic apparatus. The electronic apparatus refers to an electronic apparatus with a CPU processing function, such as a host. The electronic apparatus implements an operation process such as a simulation experiment by software and a CPU processor. The display state when the accessory is not in contact with the electronic apparatus during the operation process such as the simulation experiment is referred to as a first display state.

S102, obtaining position information of the accessory, where the position information is information indicating the position of the accessory on the display device.

The accessory refers to a physical object independent of the electronic apparatus. During the operation process such as the simulation experiment of the electronic apparatus, a user may change position or type of the accessory to change the display image of the display device, so as to improve user experience. In order to achieve the interaction between the electronic apparatus and the accessory, it is firstly required that the electronic apparatus obtains the position information of the accessory. In the embodiment of the invention, the accessory is placed on the display device and is in contact with the display device, and the position information is information indicating the position of the accessory on the display device, for example, the position information may be coordinate value of the accessory on the display device. There are two ways for obtaining the position information of the accessory.

A first way: the electronic apparatus receives the position information transmitted from the accessory, where the accessory includes:

an information transmitting module, configured to transmit the position information of the accessory to the electronic apparatus.

Preferably, the accessory may also be provided with a data collecting module, for actively collecting the position information of the accessory according to the position of the accessory, and transmitting the position information to the electronic apparatus by the information transmitting module. The information transmitting module may transmit by wireless transmission function, for example, the position information is transmitted by Bluetooth, infrared.

A second way: the electronic apparatus collects the position information of the accessory, where the electronic apparatus includes:

an information collecting module, configured to collect the position information of the accessory.

Optionally, the information collecting module may be a gravity sensor. When the accessory is placed on the display device, the gravity sensor generates the position coordinate value of the accessory according to the position of the accessory, and transmits the position coordinate value to the electronic apparatus.

Furthermore, in order to enable the electronic apparatus to obtain the covered area of the accessory, the information collecting module may be an image pick-up device arranged on the display device for shooting the accessory placed on the display device and transmitting the shot image to the electronic apparatus; the electronic apparatus may obtain the covered area of the accessory by performing a binary process on the obtained image.

Furthermore, the information collecting module may be an infrared detector arranged on the display device. The infrared detector has high sensitivity, and may emit infrared to scan the accessory placed on the display device, so as to quickly obtain the position information of the accessory.

S103, obtaining attribute information of the accessory, where the attribute information is used to change the display state of the display device.

The attribute information of the accessory may include, for example, function, type, shape, material, of the accessory. In different application environments, the attribute of the accessory has different function. For example, when a light reflection simulation experiment is performed, it needs to obtain the type of the accessory, for example, the accessory is a plane mirror or a convex lens. The electronic apparatus processes data according to the type of the accessory, generates a state switching instruction, and changes the display state of the display device. There are two ways for obtaining the attribute information of the accessory.

A first way, the electronic apparatus receives the attribute information transmitted from the accessory, where the accessory includes:

an information transmitting module, configured to transmit the position information of the accessory to the electronic apparatus.

A second way: the electronic apparatus collects the attribute information of the accessory, where the electronic apparatus includes:

an information collecting module, configured to collect the position information of the accessory.

As an example, a barcode may be provided on the accessory, the barcode is a graphic identifier in which multiple black bars and blank spaces having different widths are arranged according to a certain coding rule for expressing a set of information. The electronic apparatus scans the barcode carrying the attribute information of the accessory by the information collecting module, to obtain the attribute information of the accessory.

S104, generating a state changing instruction according to the position information and the attribute information.

Specifically, an application program is preset in the electronic apparatus, the application program may generate a state changing instruction according to the obtained position information and attribute information, and the electronic apparatus switches the first display state of the display device according to the state changing instruction.

S105, switching the first display state of the display device to a second display state according to the state changing instruction, where the second display state is a display state in a case that the electronic apparatus and the accessory operate interactively, and the first display state is different from the second display state.

In the embodiment of the invention, the second display state is a display state of the display device that the electronic apparatus has interacted with the accessory, and the first state is a display state that the electronic apparatus does not interact with the accessory, therefore, the second display state is different from the first display state.

Specifically, the switching the first display state of the display device to the second display state according to the state changing instruction includes:

generating display information according to the state changing instruction, where the display information includes graphics of an image to be displayed; and displaying the graphics of the image to be displayed on the display device according to the display information.

It should be noted that the accessory placed on the display device may be moved. The position of the accessory changes after the accessory is moved. It is required that the electronic apparatus obtains the position information of the accessory again. However, the attribute information, once obtained, may be stored in the memory of the electronic apparatus, and read directly from the memory when needed. The attribute information may also be obtained again after the accessory is moved.

In the interactive method according to the embodiment of the invention, by dynamically changing the position of the accessory placed on the display device, the electronic apparatus may obtain the position information and the attribute information of the accessory placed on the display device, generate the state changing instruction, and switch the display state of the display device according to the state changing instruction, therefore, the interaction between the accessory and the electronic apparatus is achieved, the dynamic interaction between the user and the electronic apparatus is further achieved, and the user experience is improved.

Second Embodiment

Figure 2:
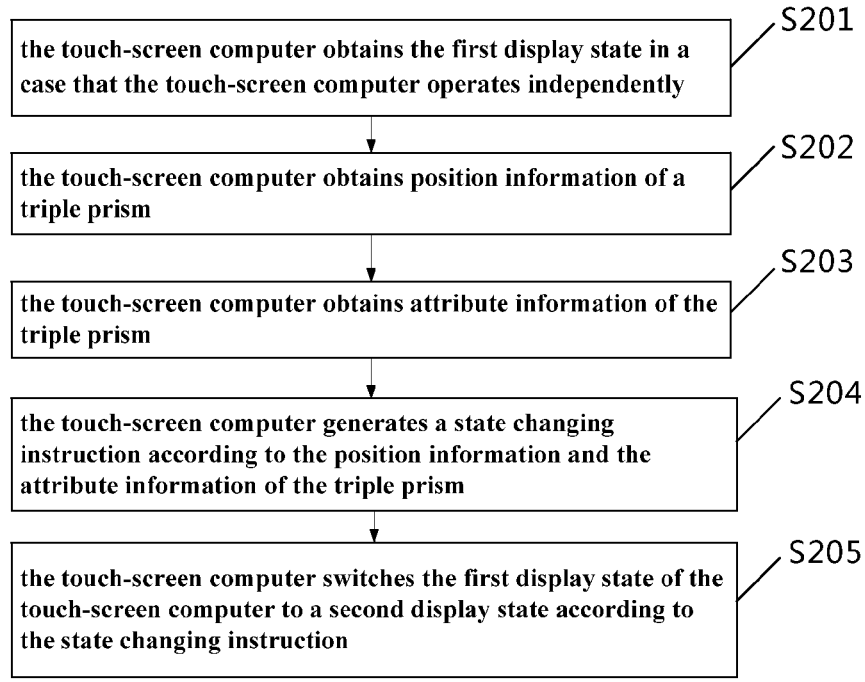
FIG. 2 is a flowchart of another method according to the invention.

According to an embodiment of the invention, it is further provided an interactive method, which will be illustrated by taking a physical optical simulation experiment performed by a touch-screen computer and a plane mirror as an example. As shown in FIG. 2, the method includes:

S201, obtaining, by the touch-screen computer, a first display state in a case that the touch-screen computer operates independently.

Figure 3:
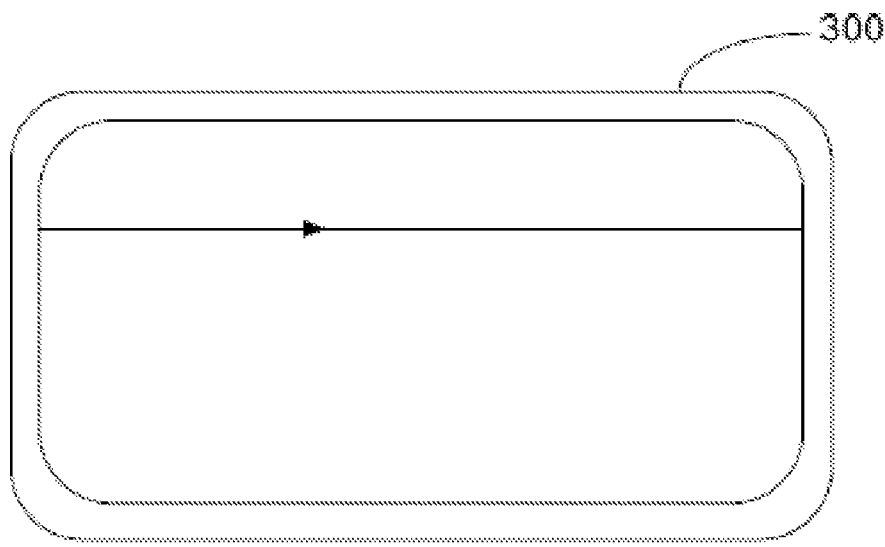
FIG. 3 is a display state of a touch-screen computer according to the invention.

Specifically, as shown in FIG. 3, when there is no plane mirror placed on the touch-screen computer 300, the touch-screen computer 300 displays a straight line, the line may be considered as a simulated direct light beam emitted from a light source, and at this time the display state of the touch-screen computer is the first display state.

S202, obtaining, by the touch-screen computer, position information of the plane mirror.

When the plane mirror is placed on the touch-screen computer, the touch-screen computer obtains the specific position information of the plane mirror, such as coordinate values of points at the edge of the plane mirror.

S203, obtaining, by the touch-screen computer, attribute information of the plane mirror.

In the embodiment of the invention, the attribute information is the type of the accessory, i.e., the accessory placed on the touch-screen computer is a plane minor. Since the plane mirror can achieve light reflection in the physical optical experiment, the touch-screen computer generates a state changing instruction according to a law that an incident angle equals an emergence angle when light is reflected.

S204, generating, by the touch-screen computer, a state changing instruction according to the position information and the attribute information of the plane minor.

After obtaining the position information and the attribute information of the plane mirror, the touch-screen computer may perform specific calculations to generate the state changing instruction, such that the display device can switch the display state.

S205, switching, by the touch-screen computer, the first display state of the touch-screen computer to a second display state according to the state changing instruction.

Figure 4:
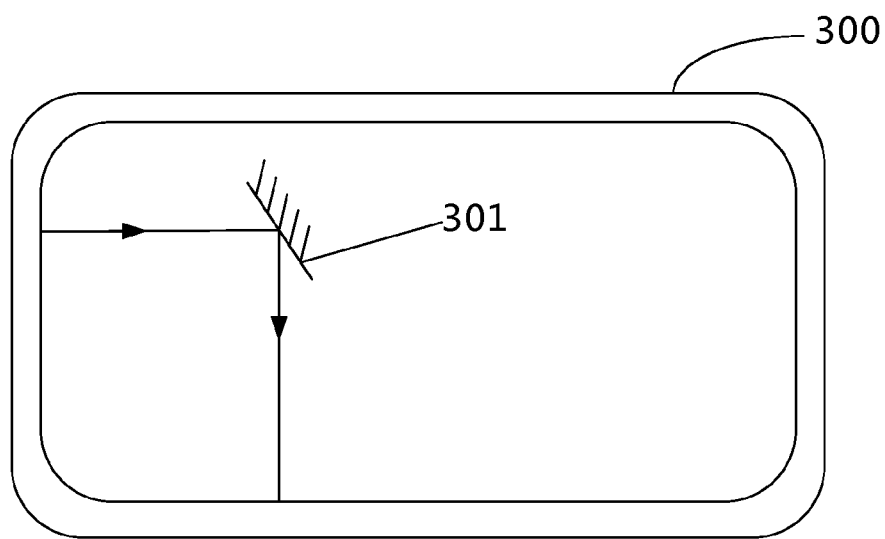
FIG. 4 is another display state of the touch-screen computer according to the invention.

As shown in FIG. 4, after obtaining the position information and the attribute information of the plane minor 301, the touch-screen computer 300 performs calculations according to the reflection principle of the plane mirror, to obtain the reflection angle of the simulated light beam after the simulated light beam meets the plane mirror, and thereby generates the state changing instruction, and switches the first display state of the display device to the second display state that appears after the light beam is reflected by the plane mirror.

In the interactive method according to the embodiment of the invention, by dynamically changing the position of the plane minor placed on the touch-screen computer, the touch-screen computer obtains the position information and the attribute information of the plane mirror placed on the display device, generates the state changing instruction, and switches the display state of the display device according to the state changing instruction, thus the interaction between the plane mirror and the touch-screen computer is achieved, the dynamic interaction between the user and the touch-screen computer is further achieved, and the user experience is improved.

Third Embodiment

Figure 5:
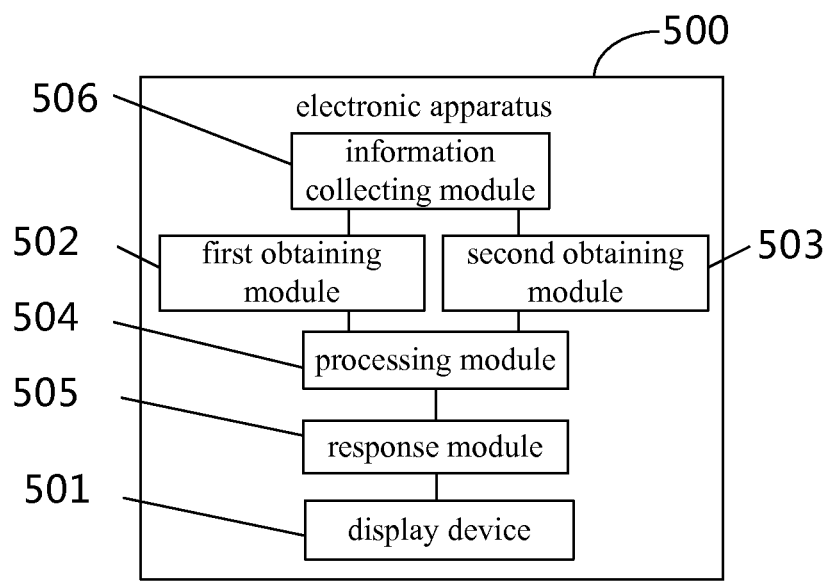
FIG. 5 is a schematic structure diagram of an electronic apparatus according to the invention.

As shown in FIG. 5, according to an embodiment of the invention, it is provided an electronic apparatus 500, which includes a display device 501, and further includes a first obtaining module 502, a second obtaining module 503, a processing module 504 and a response module 505.

The first obtaining module 502 is configured to obtain a first display state of the display device, where the first display state is a display state in a case that the electronic apparatus operates independently.

The second obtaining module 503 is configured to: obtain position information of the accessory, where the position information is information indicating the position of the accessory on the display device; and obtain attribute information of the accessory, where the attribute information is used to change the display state of the display device.

The processing module 504 is configured to generate a state changing instruction according to the position information and the attribute information.

The response module 505 is configured to switch the first display state of the display device to a second display state according to the state changing instruction, where the second display state is a display state in a case that the electronic apparatus and the accessory operate interactively, and the first display state is different from the second display state.

Furthermore, the second obtaining module 503 is further configured to:

receive the position information and/or the attribute information transmitted from the accessory, and the accessory includes:

an information transmitting module configured to transmit the position information and/or the attribute information of the accessory to the electronic apparatus.

The electronic apparatus according to the embodiment of the invention also includes an information collecting module 506 configured to collect the position information and/or the attribute information of the accessory.

Furthermore, the processing module 504 is further configured to generate display information according to the state changing instruction, where the display information includes graphics of an image to be displayed; and display the image on the display device according to the display information.

Figure 6:
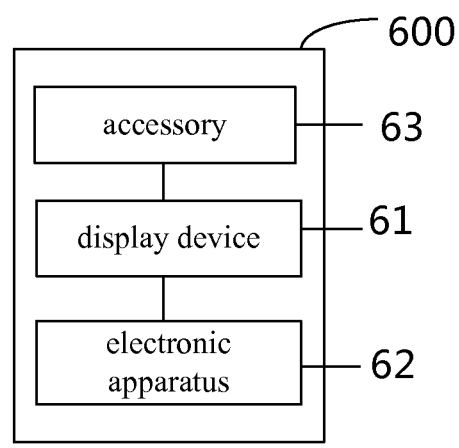
FIG. 6 is a schematic structure diagram of an interactive system according to the invention.

As shown in FIG. 6, according to an embodiment of the invention, it is further provided an interactive system 600, which includes a display device 61, an electronic apparatus 62 and an accessory 63.

The display device 61 is configured to display an image.

The electronic apparatus 62 is configured to obtain position information and attribute information of the accessory, generate a state changing instruction according to the position information and the attribute information of the accessory, and switch a first display state of the display device to a second display state according to the state changing instruction.

The accessory 63 is placed on the display device and is configured to transmit the position information and the attribute information of the accessory to the electronic apparatus.

In the interactive method, apparatus and system according to the embodiment of the invention, by dynamically changing the position of the accessory placed on the display device, the electronic apparatus obtains the position information and the attribute information of the accessory placed on the display device, generates the state changing instruction, and changes the display state of the display device according to the state changing instruction, thus the interaction between the accessory and the electronic apparatus is achieved, the dynamic interaction between the user and the electronic apparatus is further achieved, and the user experience is improved.

Those skilled in the art can understand that all or part of steps for achieving the above method embodiment can be implemented by hardware associated with program instructions. The above-mentioned program may be stored in a computer readable storage medium, and the steps of the above method embodiment are performed when the program is executed. The above-mentioned storage medium includes any medium which can store program codes, such as ROM, RAM, magnetic disk or optical disk.

The above are only specific embodiments of the invention, and the protection scope of the invention is not limited thereto. Any variation or substitution which can be easily conceived by those skilled in the art within the technical scope disclosed by the invention should fall within the protection scope of the invention. Therefore, the protection scope of the invention should be based on protection scope of the claims.

The invention claimed is:

1. An interactive method, which is applied to an electronic apparatus and an accessory independent of the electronic apparatus, wherein the electronic apparatus comprises a display device, the method comprises:

obtaining a first display state of the display device, wherein the first display state is a display state in a case that the electronic apparatus operates independently;

obtaining position information of the accessory, wherein the position information is information indicating the position of the accessory on the display device;

obtaining attribute information of the accessory, wherein the attribute information is used to change display state of the display device and the attribute information of the accessory indicates what the accessory is;

generating a state changing instruction according to the position information and the attribute information; and switching the first display state of the display device to a second display state according to the state changing instruction, wherein the second display state is a display state in a case that the electronic apparatus and the accessory operate interactively, and the second display state is determined by the first display state and the attribute information of the accessory and formed based on the first display state;

wherein the attribute information of the accessory indicates that the accessory is a plane mirror; the state changing instruction comprises a reflection angle of a simulated light beam after the simulated light beam meets the plane mirror; and the reflection angle is calculated according to a reflection principle of the plane mirror.

2. The method according to claim 1, wherein the obtaining position information of the accessory and/or the obtaining attribute information of the accessory comprises:

receiving, by the electronic apparatus, the position information and/or the attribute information transmitted from the accessory, wherein the accessory comprises:

an information transmitting module, configured to transmit the position information and/or the attribute information of the accessory to the electronic apparatus.

3. The method according to claim 1, wherein the obtaining position information of the accessory and/or the obtaining attribute information of the accessory comprises:

collecting, by the electronic apparatus, the position information and/or the attribute information of the accessory, wherein the electronic apparatus comprises:

an information collecting module, configured to collect the position information and/or the attribute information of the accessory.

4. The method according to claim 1, wherein the second display state is formed based on the first display state further comprises:

display content of the second display state at a position other than a position of the accessory on the electronic apparatus is different than display content of the first display state.

5. The method according to claim 1, wherein the switching the first display state of the display device to a second display state according to the state changing instruction comprises:

generating display information according to the state changing instruction, wherein the display information comprises graphics of an image to be displayed; and displaying the graphics of the image to be displayed on the display device according to the display information.

6. An electronic apparatus, which comprises a display device, wherein the electronic apparatus further comprises:

a first obtaining module, configured to obtain a first display state of the display device, wherein the first display state is a display state in a case that the electronic apparatus operates independently;

a second obtaining module, configured to obtain position information of an accessory, wherein the position information is information indicating the position of the accessory on the display device; and obtain attribute information of the accessory, wherein the attribute information is used to change display state of the display device and the attribute information of the accessory indicates what the accessory is;

a processing module, configured to generate a state changing instruction according to the position information and the attribute information; and a response module, configured to switch the first display state of the display device to a second display state according to the state changing instruction, wherein the second display state is a display state in a case that the electronic apparatus and the accessory operate interactively, and the second display state is determined by the first display state and the attribute information of the accessory and formed based on the first display state;

wherein the attribute information of the accessory indicates that the accessory is a plane mirror; the state changing instruction comprises a reflection angle of a simulated light beam after the simulated light beam meets the plane mirror; and the reflection angle is calculated according to a reflection principle of the plane mirror.

7. The electronic apparatus according to claim 6, wherein the second obtaining module is further configured to:

receive the position information and/or the attribute information transmitted from the accessory, wherein the accessory comprises:

an information transmitting module, configured to transmit the position information and/or the attribute information of the accessory to the electronic apparatus.

8. The electronic apparatus according to claim 6, wherein the electronic apparatus further comprises an information collecting module configured to collect the position information and/or the attribute information of the accessory.

9. The electronic apparatus according to claim 6, wherein the processing module is further configured to:

generate display information according to the state changing instruction, wherein the display information comprises graphics of an image to be displayed; and display the image on the display device according to the display information.

10. An interactive system, which comprises a display device, an electronic apparatus and an accessory, wherein the display device is configured to display an image;

the electronic apparatus is configured to obtain position information and attribute information of the accessory, generate a state changing instruction according to the position information and the attribute information of the accessory, and switch a first display state of the display device to a second display state according to the state changing instruction; and the accessory is placed on the display device and is configured to transmit the position information and the attribute information of the accessory to the electronic apparatus;

wherein the attribute information of the accessory indicates what the accessory is, the second display state is determined by the first display state and the attribute information of the accessory and formed based on the first display state;

wherein the attribute information of the accessory indicates that the accessory is a plane mirror; the state changing instruction comprises a reflection angle of a simulated light beam after the simulated light beam meets the plane mirror; and the reflection angle is calculated according to a reflection principle of the plane mirror.

* * * * *